(12) United States Patent  (10) Patent No.: US 8,136,865 B1
Beck  (45) Date of Patent: Mar. 20, 2012

(54) MOTORCYCLE WINDBREAKER

(76) Inventor: Ronald R Beck, Mukwonago, WI (US)

( * ) Notice: Subject to any disclaimer, the term of this patent is extended or adjusted under 35 U.S.C. 154(b) by 349 days.

(21) Appl. No.: 12/589,959

(22) Filed: Oct. 31, 2009

(51) Int. Cl.
*B60J 9/00* (2006.01)

(52) U.S. Cl. ........... 296/136.08; 296/136.01; 296/136.1; 296/136.13

(58) Field of Classification Search ................. 296/78.1, 296/180.1, 181.5, 136.01, 136.08, 136.1, 296/136.13; 150/166, 167
See application file for complete search history.

(56) References Cited

U.S. PATENT DOCUMENTS

| 1,729,086 | A | * | 9/1929 | Premont ...................... 296/78.1 |
| 4,130,315 | A |  | 12/1978 | Shields |
| 4,135,758 | A |  | 1/1979 | Clements |
| 5,562,139 | A | * | 10/1996 | Cseri .............................. 150/167 |
| 6,120,083 | A | * | 9/2000 | Gunther ....................... 296/78.1 |
| 6,231,104 | B1 | * | 5/2001 | Roethel ........................ 296/78.1 |
| 6,923,489 | B2 | * | 8/2005 | Keys ............................ 296/77.1 |
| 7,032,948 | B2 | * | 4/2006 | Khan ........................... 296/78.1 |
| 7,404,585 | B2 |  | 7/2008 | Bugni |
| 2004/0051336 | A1 | * | 3/2004 | Chiao et al. .................. 296/78.1 |

* cited by examiner

*Primary Examiner* — Lori Lyjak
(74) *Attorney, Agent, or Firm* — Jeffrey W. Sainio

(57) ABSTRACT

A windbreaker for a motorcycle prevents airflow between the front wheel assembly and the fairing connected to the handlebars, by flexibly connecting to the handlebars and the crash bars. An indentation allows airflow to cool the engine. Releasable connectors allow proper turning of the front wheel, even if mis-mounted.

12 Claims, 2 Drawing Sheets

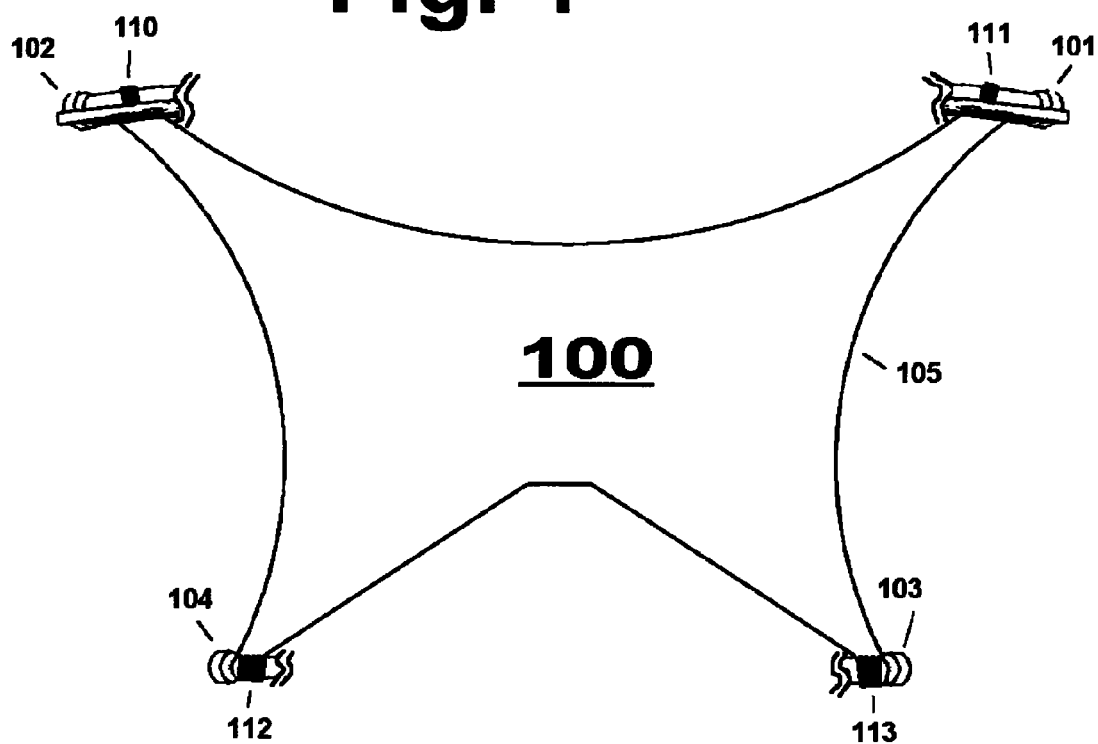

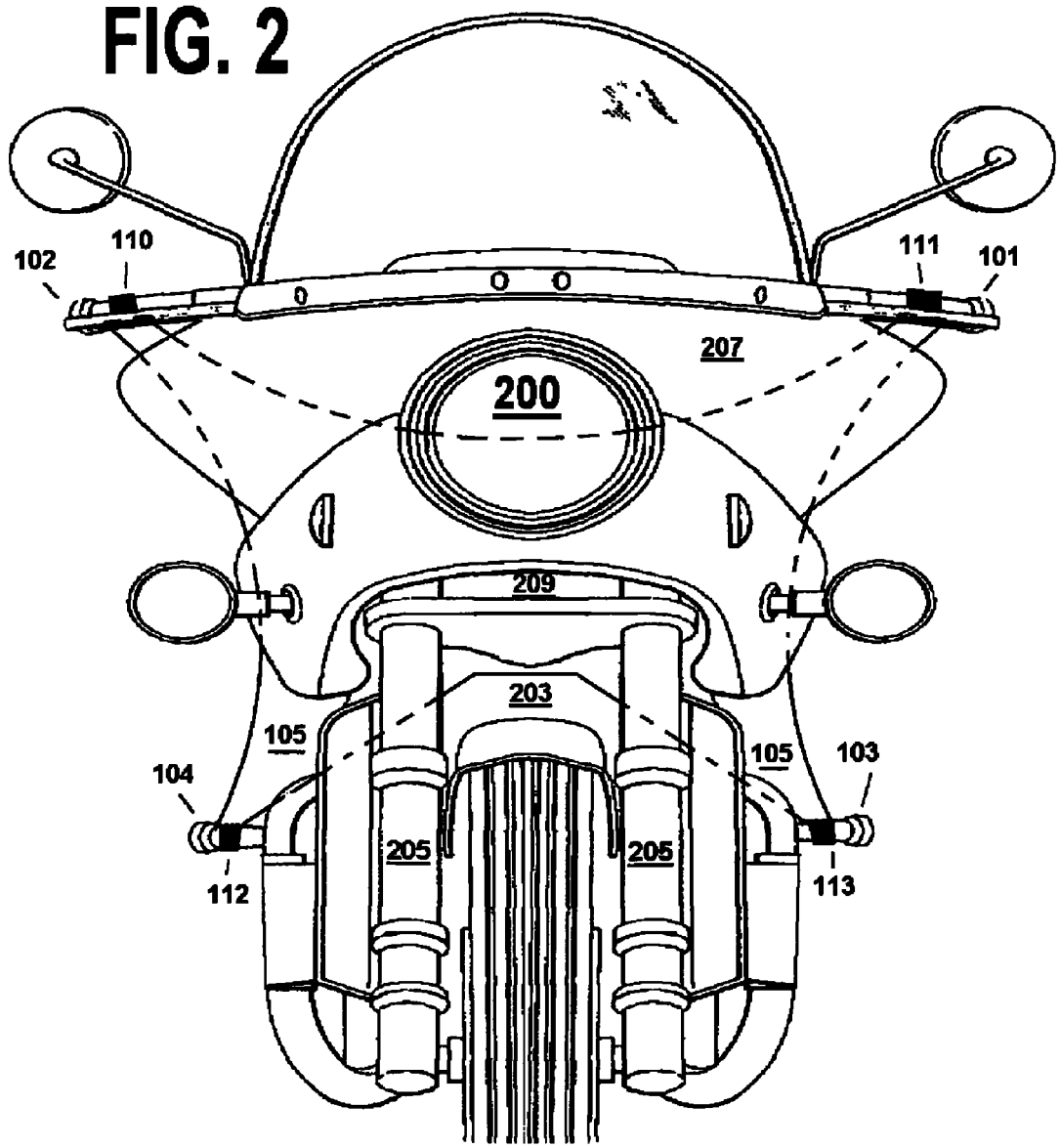

MOTORCYCLE WINDBREAKER

FIELD OF THE INVENTION

The invention is directed toward the field of motorcycle fairings, and more particularly to a windbreaker which is operative in the region between the fixed motorcycle frame and the steerable front wheel assembly.

BACKGROUND OF THE INVENTION

The exciting feel of wind through the hair of a motorcycle rider, yields in autumn to progressive discomfort due to cold wind. This despite an air-cooled engine which provides more than enough heat, if properly channeled. Many solutions to this problem have been attempted. Heat deflectors such as disclosed in U.S. Pat. No. 6,854,542, to Schoonover, move the heated engine air to more desired locations. Fairings such as in U.S. Pat. Nos. 4,010,976 to Shields, 4,135,758 to Clements, or 7,404,585 to Bugni, disclose various airshields which block excessive wind chilling the rider.

Any device which minimizes chilling, should be lightweight, removable for time of hot weather, and should allow airflow for cooling the engine, which is typically between the rider's shins.

In front of the rider, a motorcycle has a steerable front wheel with handlebars, and associated components which rotates with the front wheel, such as windshield, fairings, headlight and turn signals, which will henceforth be called steering-column-associated (SCA) components. Other components in front of the rider are fixed to the motorcycle frame rather than connected to the steerable front wheel, such as footrests, gas tanks, and radio speakers, and will be referred to as fixed components. Also, a crash bar is usually near the location of the rider's feet. A crash bar juts out sideways, further than any other component of the lower part of the motorcycle. If a motorcycle tips sideways, the crash bar will hit the pavement first, preventing the rider's leg from being pinned under the motorcycle.

For steering to occur without the various SCA and fixed components hitting each other, some clearance must exist between them. This clearance is usually a gap that allows cold air to chill the rider. Prior-art devices to minimize airflow through this gap, are either very large, such as shown in U.S. Pat. No. 7,404,585, or are connected only to SCA components and provide an incomplete seal, as in the remainder of patents listed above. There exists a need for a motorcycle windbreaker which prevents airflow between the SCA and fixed components, without impeding normal steering.

SUMMARY OF THE INVENTION

The preferred form of the instant invention provides a sheet of flexible material, such as fabric or leather, connected to the handlebars and crash bars, which fills the SCA-to-fixed component gap and prevents airflow in the clearance area, keeping the rider from being subjected to the cold airflow. An indentation in front of the engine, allows airflow for engine cooling.

BRIEF DESCRIPTION OF THE DRAWINGS

FIG. 1 shows the windbreaker, detached from a motorcycle except for reference connection points.

FIG. 2 shows the windbreaker, mounted on a motorcycle.

DETAILED DESCRIPTION OF THE PREFERRED EMBODIMENT

Referring to FIG. 1, the windbreaker 100 is primarily a web or sheet of flexible material 105, such as leather or windproof fabric. The bottom of web 105 connects to fixed components of the motorcycle (parts of the motorcycle which would block the view of the windbreaker being omitted) such as left-side crash bar 103 and right-side crash bar 104 with connectors such as fabric loops 112-113 which loop around the crash bars 103-104 and connect back to web 105 by connectors such as snaps, lacing, or the hook-and-loop fabric system known as VELCRO®. Similarly, the top of web 105 connects to SCA components on either side, such as the left handlebar 101 and right handlebar 102 with connectors 110-111, which are similar to connectors 112-113.

Referring to FIG. 2, motorcycle 200 is shown with the windbreaker 100 installed. Windbreaker 100 is placed behind the front-wheel forks 205 and fairing 207, but in front of fixed components such as the seat and gas tank, and connected to handlebars 101 and 102. Thus airflow through gap 209 is prevented, while airflow needed to cool the engine is provided is provided through indentation 203. Heated air from the motorcycle engine is therefore not blown away, but may diverted, such as by the apparatus of U.S. Pat. No. 6,854,542, to warm the rider. The shape of indentation 203 may be modified to provide needed airflow to the engine, while preventing excess airflow that may chill the rider's legs.

Since windbreaker 100 is flexible, steering is not impeded; the windbreaker merely twists, maintaining operation without preventing rotation of the SCA components. In case of shrinkage in rain or mis-installation, connectors 110-113 are preferably breakaway connectors such as snaps or the hook-and-loop fabric system known as VELCRO®, which will disconnect if overtensioned. Catastrophic prevention of needed steering is therefore avoided.

Table 1 shows the effect of the windbreaker on windspeed and temperature at the top of a rider's knee, as well as on the front and rear cylinders of a 2-cylinder air-cooled engine of a 2009 Harley Davidson Electra Glide Ultra Classic Touring Bike:

TABLE 1

| Outside Temp | Vehicle Air Speed | Wind Speed Without Wind Breaker | Leg Temp Without Wind Breaker | Front Engine Temp Without Wind Breaker | Rear Engine Temp Without Wind Breaker | Wind Speed With Wind Breaker | Leg Temp With Wind Breaker | Front Engine Temp With Wind Breaker | Rear Engine Temp With Wind Breaker |
|---|---|---|---|---|---|---|---|---|---|
| 68.4 | 40 mph | 17 mph | 71.4 | 230 | 283 | 1 mph | 78.1 | 228 | 308 |
| 68.7 | 60 mph | 24 mph | 71.4 | 226 | 290 | 2 mph | 77.2 | 212 | 290 |
| 72.9 | 40 mph | 15 mph | 71.3 | 183.9 | 241.0 | 0 mph | 80.8 | 178.3 | 298 |
| 72.3 | 60 mph | 27 mph | 71.5 | 145.1 | 251.0 | 0 mph | 79.3 | 167.6 | 279 |
| 49.8 | 40 mph | 14 mph | 53.2 | 189 | 289 | 1 mph | 63.7 | 184.2 | 265 |
| 50.5 | 60 mph | 22 mph | 53.8 | 201 | 292 | 3 mph | 62.2 | 194.9 | 293 |

TABLE 1-continued

| Outside Temp | Vehicle Air Speed | Wind Speed Without Wind Breaker | Leg Temp Without Wind Breaker | Front Engine Temp Without Wind Breaker | Rear Engine Temp Without Wind Breaker | Wind Speed With Wind Breaker | Leg Temp With Wind Breaker | Front Engine Temp With Wind Breaker | Rear Engine Temp With Wind Breaker |
|---|---|---|---|---|---|---|---|---|---|
| 34.9 | 40 mph | 13 mph | 39.2 | 190 | 242 | 1 mph | 45.3 | 193.6 | 273 |
| 36.5 | 60 mph | 23 mph | 38.4 | 180 | 252 | 1 mph | 46.6 | 173 | 263 |

Table 1 shows that wind is decreased at least 85% at the rider's legs, and leg temperature, as measured at the outside of clothing, increases 6 to 8 degrees F. Engine temperature remains acceptable.

The invention is not limited to the preferred mode illustrated. For instance, the windbreaker is shown as mounted at the top to the handlebars, but could be mounted to any SCA component. The windbreaker is disclosed as mounted at the bottom at the crash bar, but any static member of the motorcycle would be operable. The windbreaker composition is disclosed as leather or fabric, but any windproof flexible sheet material would be effective. Loops with the hook-and-loop fabric system known as VELCRO® or snaps are disclosed to connect the windbreaker to the motorcycle, but any operative method of connection would be operative. These and other variants are within the spirit and scope of the claims below.

What is claimed is:

1. A windbreaker (100) for use on a motorcycle (200), comprising:
   A. a motorcycle with SCA and fixed components, and a gap (209) between the SCA components and fixed components of the motorcycle;
   B. a sheet of flexible material (105), connected at the sheet upper left to a left-side SCA component, and connected at the sheet upper right to a right-side SCA component, and connected at the sheet bottom left to a left-side fixed component, and connected at the sheet bottom right to a right-side fixed component, said sheet extending behind said gap to prevent airflow through said gap.

2. The apparatus of claim 1, where the sheet has an indentation (203) which allows airflow to the motorcycle engine.

3. The apparatus of claim 1, where the sheet connections to the motorcycle are comprised of straps (110-113).

4. The apparatus of claim 1, where the SCA sheet connections to the motorcycle, are to the handlebars (101-102).

5. The apparatus of claim 3, where the straps utilize hook-and-loop fabric connectors.

6. The apparatus of claim 3, where the straps utilize snaps.

7. A windbreaker (100) for use on a motorcycle (200), comprising:
   A. windbreaking means (105) which decreases airflow at least 85% at a rider's knee at a speed of 60 MPH, by blocking a gap (209) between fixed and SCA components of the motorcycle;
   B. connection means (110-111) for connecting the windbreaking means to SCA components of the motorcycle;
   C. and connection means (112-113) for connecting the windbreaking means to fixed components of the motorcycle.

8. The apparatus of claim 7, where the windbreaking means has an indentation (203) which allows airflow to the motorcycle engine.

9. The apparatus of claim 7, where the connection means to the motorcycle are comprised of straps (110-113).

10. The apparatus of claim 7, where the SCA connection means to the motorcycle, are to the handlebars (101-102).

11. The apparatus of claim 7, where the connection means utilize hook-and-loop fabric connectors.

12. The apparatus of claim 7, where the straps utilize snaps.

* * * * *